United States Patent [19]

Henderson, deceased

[11] 4,144,915
[45] Mar. 20, 1979

[54] LIQUID SUPPLY MEASURING AND DISPENSING APPARATUS

[75] Inventor: William D. Henderson, deceased, late of Winnipeg, Canada, by Kenneth Milton McLean, executor

[73] Assignee: Murray Jack Braunstein, Winnipeg, Canada

[21] Appl. No.: 819,680

[22] Filed: Jul. 27, 1977

[30] Foreign Application Priority Data

Jul. 27, 1976 [CA] Canada ................................. 257877

[51] Int. Cl.² .............................................. B65B 3/04
[52] U.S. Cl. ..................................... 141/18; 141/231;
141/303; 141/305; 222/469; 222/482; 222/510;
141/370
[58] Field of Search ............... 222/442, 469, 482, 510;
141/18-29, 346-362, 382-389, 392, 231,
369-382, 291-294, 301-310

[56] References Cited

U.S. PATENT DOCUMENTS

| 1,042,899 | 10/1912 | Evans | 222/510 |
|---|---|---|---|
| 2,289,539 | 7/1942 | Cuno | 222/510 |
| 2,820,580 | 1/1958 | Figge | 222/510 |

FOREIGN PATENT DOCUMENTS

| 562585 | 12/1957 | Belgium | 222/510 |
|---|---|---|---|
| 101133 | 9/1923 | Switzerland | 222/510 |

*Primary Examiner*—Houston S. Bell, Jr.
*Attorney, Agent, or Firm*—D. Paul Weaver

[57] ABSTRACT

A device for the accurate measuring and for holding a discharge of liquid quantities is described as well as apparatus for charging liquid into the device from bulk storage. The measuring and dispensing device includes a liquid compartment, a dispensing nozzle, a carrying handle and a nozzle operating means adjacent the carrying handle. The compartment includes a vent which is open and closed by the nozzle operating means with a float included in the vent to shut the vent when filling the device and when liquid in the device reaches a chosen level. A coupling nozzle is engageable with the first-mentioned nozzle for charging liquid into the device and includes a stem and a sliding sleeve which cooperate with the first nozzle to allow liquid flow from the coupling nozzle through the first nozzle and into the compartment for charging the compartment. A bulk liquid transporting and delivering apparatus is also described for charging the liquid measuring and dispensing device which includes a cart for supporting a liquid container, pipe supporting means on the cart which carries the discharge nozzle and an inclined platform on the cart with hook means for retaining the bulk container on the cart. The cart includes ground engaging wheels and arcuate legs extending from the wheels to the back of the platform to permit the cart to be rocked to bring the platform to upright position for loading and unloading the bulk container on the cart.

9 Claims, 6 Drawing Figures

LIQUID SUPPLY MEASURING AND DISPENSING APPARATUS

This invention relates to an apparatus for the accurate measuring and discharge of liquid quantities, which apparatus is also convenient to use.

There are many instances in which accurate quantities of liquid are measured from bulk supply and dispensed in specific quantities, but of particular significance is the automobile service industry where accurate quantities of oil, coolant, lubricant or brake fluid are required. The beverage industry also dispenses accurate quantities of liquid, particularly in handling brewery products or spirits in refreshment and beverage lounges. When fuels are bought in small quantities for rural, cottage and recreational uses, accurate measurements of relatively small quantities of kerosine, naphtha, white gas or paint thinners and the like are required. Although many of the liquids now purchased are in throw-away containers, it has become readily apparent in the recent past that such waste, clutter and pollution cannot long be continued and means other than the throw-away container are increasingly being required for the containing, filling and subsequent disposal of liquids.

A device specifically designed for the dispensing of liquids in accurate measure, is shown in my Canadian Pat. No. 708,481 which corresponds to U.S. Pat. NO. 3,186,597, British Pat. No. 1,004,956, French Pat. No. 1,385,443 and German Pat. No. 1,456,432. In those patents a design of accurate measure is shown involving a piston movable within a cylinder. Liquid to be measured and dispensed is introduced to the underside of the piston which is maintained in resilient pressure against the liquid by means of a spring or air pressure on the upper side of the piston. While the apparatus has been found to be most efficient in practice, it does require that liquid for filling the device be introduced under a pressure which is sufficiently great to overcome the pressure exerted by the air or the spring. The requiring of such pressure can be a disadvantage where the bulk supply of liquid for filling the dispenser cannot conveniently be placed under pressure or arranged at a considerable height above the charging station to give the required pressure for filling the dispenser.

It is to meet these problems and others posed by the prior art that the present invention has been realized. This disclosure, therefore, shows a portable liquid dispenser which can be charged accurately to a predetermined measure of liquid by means of a readily-portable bulk charger and which dispenser provides for simple discharging of the liquid from it. In modified forms of the dispenser, discharge may be under pressure using a non-polluting propellant, such as air.

More particularly in accordance with the invention there is provided a liquid measuring and dispensing device which comprises:

a liquid compartment, a bottom, side and top wall to the liquid compartment, handle carrying means to said compartment, a dispensing nozzle below said bottom wall and operatively connected for liquid flow from said compartment through said nozzle, liquid venting means through the top wall, a float-insert operatively arranged to close said vent when liquid in said compartment reaches a chosen level, nozzle operating means adjacent said carrying handle, shut-off means in said dispensing nozzle movable between an open and closed position, means connecting the nozzle operating means to the shut-off means for controlling liquid flow through said nozzle, and closure means for said vent in said top activated by said nozzle operating means and adapted to close said vent when said nozzle control is in closed position. The nozzle may comprise a hollow sleeve with the shut-off means comprising an annular lip terminating sleeve and a lip engaging member for resiliently sealing against the lip. A coupling nozzle for operative engagement with the first nozzle may be included and comprise a stem with a hollow interior, orifice means in the stem communicating the outside to the interior, and a sliding sleeve on the stem for obturating the orifice. Coupling of the two nozzles causes the stem operatively to move the lip engaging member off the lip and the nozzle sleeve to move the hollow sleeve to allow liquid from within the stem to pass through the orifices into the nozzle and subsequently into the compartment.

An atomizing nozzle may be connected to the compartment for atomizing and discharging liquid placed under pressure in the compartment. An air pump may be included for introducing air under pressure to the compartment.

Liquid transporting and dispensing means is also provided, which comprises, cart means defining a forwardly inclined platform for receiving and supporting a liquid container, pipe supporting means on said cart below said platform for receiving and supporting a pipe assembly for coupling to the container for delivering liquid from the container to a liquid discharge coupling on said pipe, said coupling being subject to thrusting forces upon coupling for discharging of said liquid and said forces being opposed by the pipe supporting means, the inclined platform comprising at least a pair of inclined rails for supporting said container on either side of the container and a rib raised on said platform at the rear of the cart, hook means at the front of said cart adjacent the platform for engaging a lip on said container, ground engaging wheels on said cart towards the rear of said cart and arcuate legs extending in a smooth curve backwardly from said wheels to the rear of the platform for permitting rearward rocking of said cart on said legs for bringing said platform to upright position with said container resting against said stop in an upright position for easy replacement of said container on said cart. A handle may be received in tubular means on the cart for rocking the cart on its legs. The hook means can be provided on the end of a shaft received in a tube attached to the cart with the shaft sliding within the tube to allow the hook means to catch against the container.

In a description of specific embodiments of the invention which follows, reference will be made to the drawings in which, FIG. 1 shows a side view partly in section of a hand-held dispensing apparatus;

Figure 1:
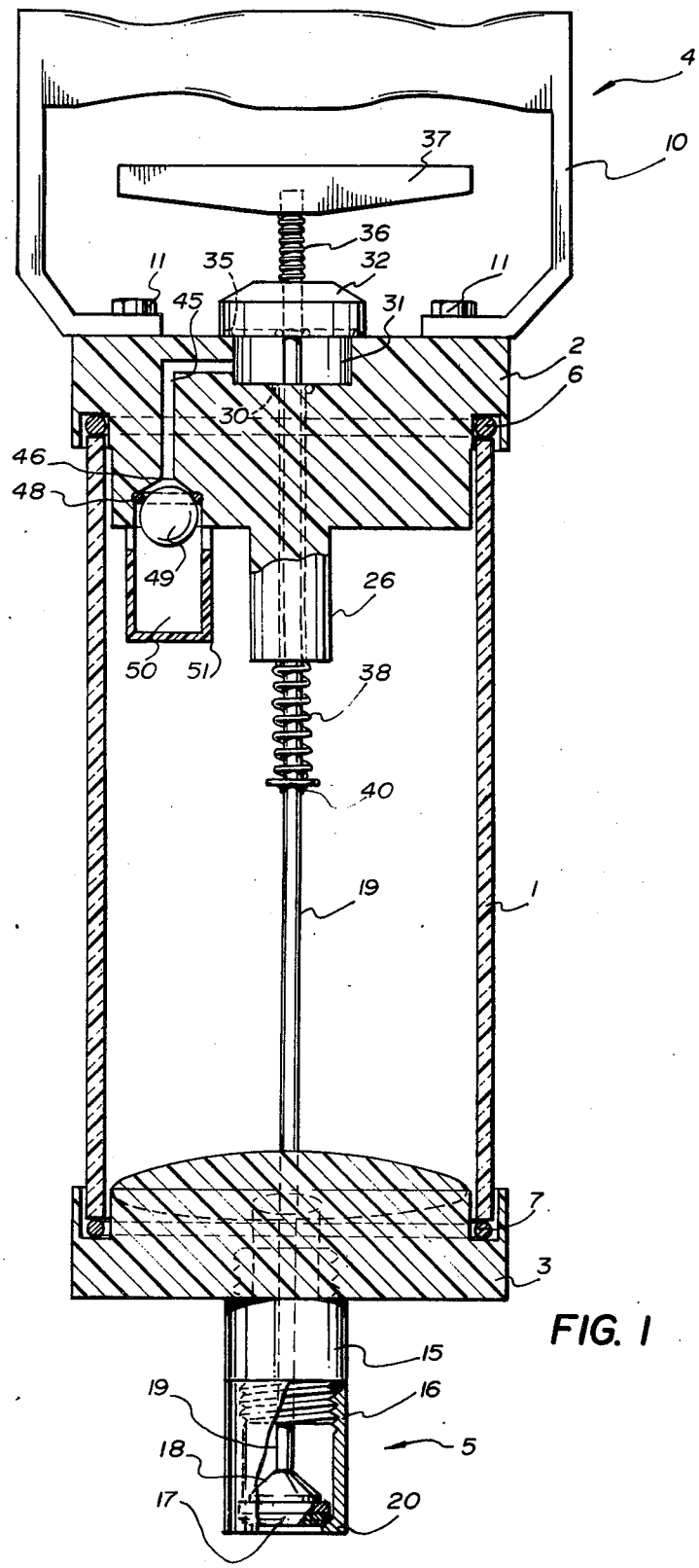

As seen in FIG. 1, the dispensing apparatus consists of a plastic cylinder 1 with top cap 2 and bottom cap 3 carrying handle assembly 4 and nozzle 5 respectively. The cylinder 1 is sealed to the end caps by sealing rings 6 and 7 respectively. The top cap 2 carries a handle 10 bolted to the cap at 11. The end caps are maintained in position on the cylinder 1 by means of a bolt or tie rod (not shown) which passes from the top cap 2 through the cylinder 1 and to the bottom cap 3 in which it is secured. By being placed in tension, the bolt continuously urges the end caps towards one another, thereby effectively compressing the seals 6 and 7 against the cylinder 1. The bolt may be made to pass completely through the end caps and be headed at one end, carrying a nut on the other end, in which case an O-ring or other suitable seal is placed in the passages through the end caps in which the bolt passes, for effective sealing against the egress of contents from the cylinder through the end caps.

The nozzle assembly 5 comprises a base 15, a shroud 16 and elastomeric end piece 17 secured on head 18 and attached to shaft 19. The base 15 is threaded into a passage in the bottom cap 3, so that liquid may pass from within the cylinder 1 and into the space within shroud 16. Sealing is effected between the elastomeric piece 17 and rim 20 of the shroud to prevent passage of liquid over the rim when the seal is held against it by downward pressure on the rod 19. The rod 19 passes upwards through the cylinder and through a passage 25 in the top cap 2 and an extension 26 on the top cap for additional support and guidance. An O-ring seal 30 engages the rod 19 as it passes into cavity 31 in the top cap 2. The rod 19 continues upwardly through the cavity 31 and carries a hat piece 32 which sealingly covers the cavity 31 by means of an O-ring 35 around its perimeter. The hat piece is urged against the upper part of top cap 2 by means of a spring 36 which engages against a transverse handle 37 in which the rod 19 terminates. A spring 38 is provided within the cylinder engaging against the nose of extension 26 and the stop 40 placed on the rod 19 for urging the rod 19 downwardly so that the seal 17 beds on the rim 20 in nozzle 5.

The head cap 2 also includes a passage 45 which connects the recess 31 to a space 46 in the cap 2 leading from the interior of the cylinder 1. The space 46 includes a sealing member 48 in its roof and a floatable spherical member 49 (a general automotive light bulb in the prototype) held captive within a space 50 defined by a perforate cage 51 beneath the cavity 46. In the condition shown in the drawing of FIG. 1 the apparatus is entirely full of liquid.

Figure 2:
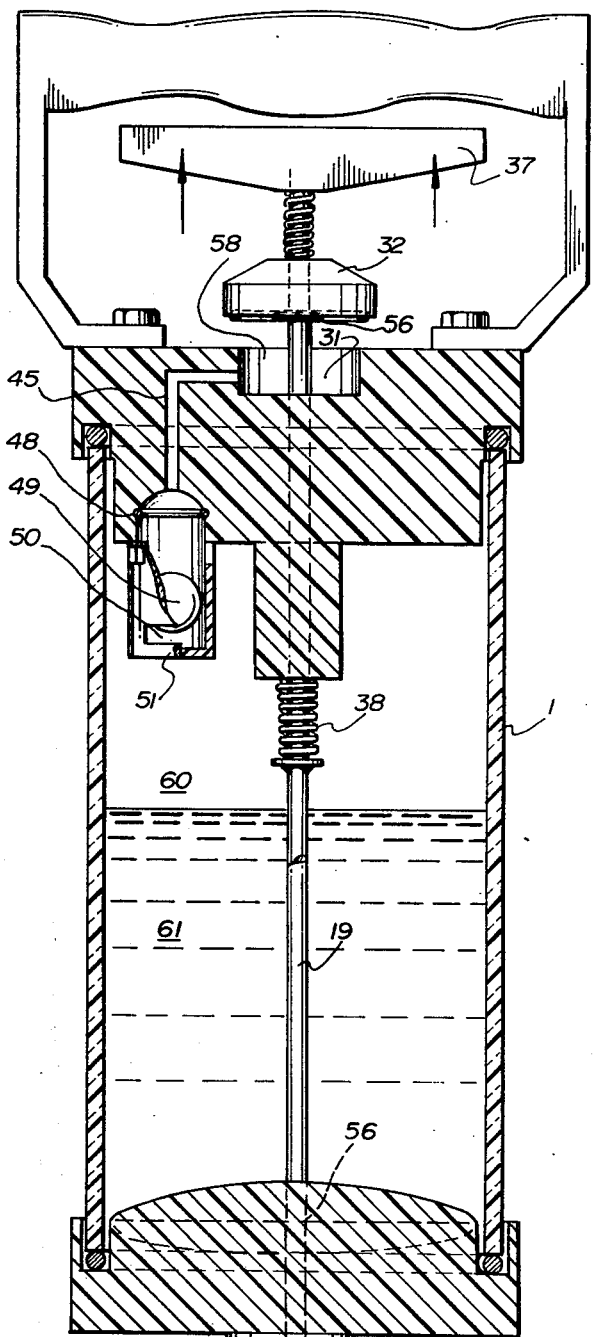
FIG. 2 shows the same view as FIG. 1 with the apparatus in liquid discharging condition.

In FIG. 2 of the drawing, it is assumed that the liquid is being discharged from the apparatus. The transverse handle member 37 has been raised, thereby lifting the seal 17 from the rim 20 in nozzle 5, so that liquid is free to flow over the rim and out through the hole 21 in the shroud 16 as indicated by the arrow 55 and 56. The raising of the handle 37 compresses the spring 38, but also allows the hat 32 to be raised from its covering position on the recess 31 by means of stop 56. Air can now enter the recess 31 as shown by arrow 58, pass down passage 45, into space 50 and out of cage 51 into the space 60 above the liquid 61 in the cylinder 1.

When the apparatus of FIGS. 1 and 2 is to be filled with liquid, the nozzle 5 is coupled to a charging nozzle described later, which pushes up the seal 17 and head 18 against the resilience of rod 19 effected by spring 38, so that the flow of liquid over the lip 20 is reversed from that shown in FIG. 2. The apparatus continues to fill by the reverse process to that shown in FIG. 2 until the level of the liquid 61 rises sufficiently to drive the floatable sphere 49 upwards into the space 46 and seal against 48. At this point, filling of the cylinder ceases, since the passage 45 becomes closed and the entire inside of the cylinder 1 is full of liquid. The hat 32 provides a double protection against the entry of dust into the passage 45 and also provides additional effective sealing, should the apparatus be inverted while full of liquid or otherwise shaken so that the sphere 49 falls temporarily out of seal with 48.

Figure 3:
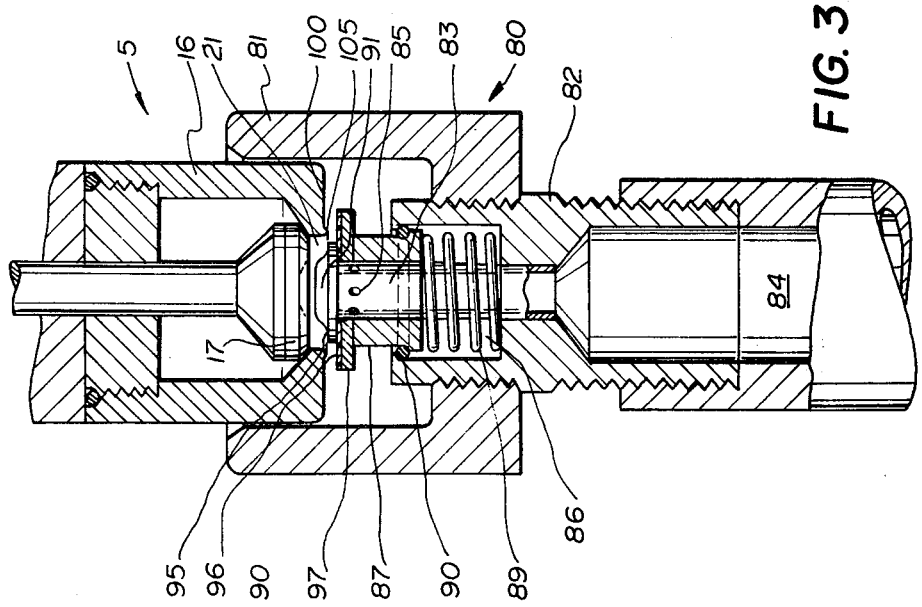
FIG. 3 shows a front view partly in section of an apparatus for charging the dispenser of FIGS. 1 and 2.

As seen in FIG. 3, the nozzle 5 cooperates with a feed nozzle 80. The shroud 16 is received for guidance within embracing piece 81, received on central section 82, from which protrudes a stem 83 into the inside of which liquid can be led through pipe 84. The stem 83 includes orifices 85 which are obturated by a sliding sleeve 87 carried on the stem 83. The sleeve 87 is urged upwardly from the central portion 82 by springs 89 and is sealed at 90 to prevent leakage of liquid which may enter space 86 from orifices 85. The stem 83 includes a head portion 91 complementarily shaped to the underside of elastomeric head 17. The underside of lips 95 on head 91 contact a sealing washer 96 carried on the transversely-formed upper end 97 of the sleeve 87. This seal prevents leakage of liquid over the lips 95.

Figure 4:
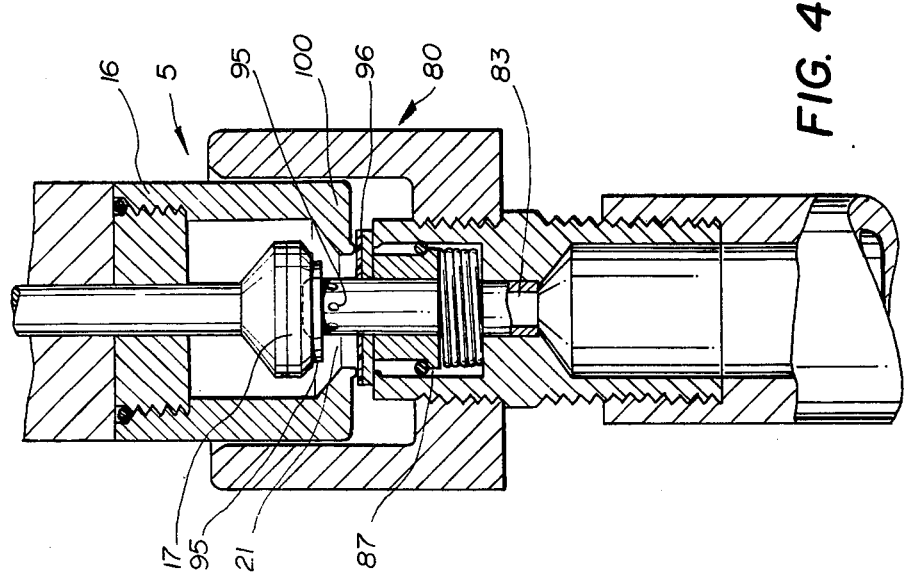
FIG. 4 shows a side view of the apparatus of FIG. 3.

If the nozzle 5 is now moved downwardly from the position of FIG. 3 into that of FIG. 4, it is seen that the elastomeric head 17 is raised after the lips 95 are received within the passage 21. When the lowermost part 100 of the shroud 16 contacts the seal 96, the sleeve 87 is depressed and as the nozzle 5 is continued to be moved downwardly, holes 85 are opened and liquid flows from within the stem 83 into the interior of shroud 16 and then into the apparatus of FIGS. 1 and 2. This particular arrangement provides for a drip-free coupling without leakage, since the dispensing apparatus has an automatic floating shut-off 49 and leakage cannot occur at the coupling between nozzles 5 and 80 at any time during the coupling or uncoupling action. It should be noted that in order to ensure a positive seal between the part 100 and the sealing washer 96 (see particularly FIG. 3), a depending ridge 105 which beds down in the resilient washer 96, when in the position of FIG. 4 is provided.

Figure 5:
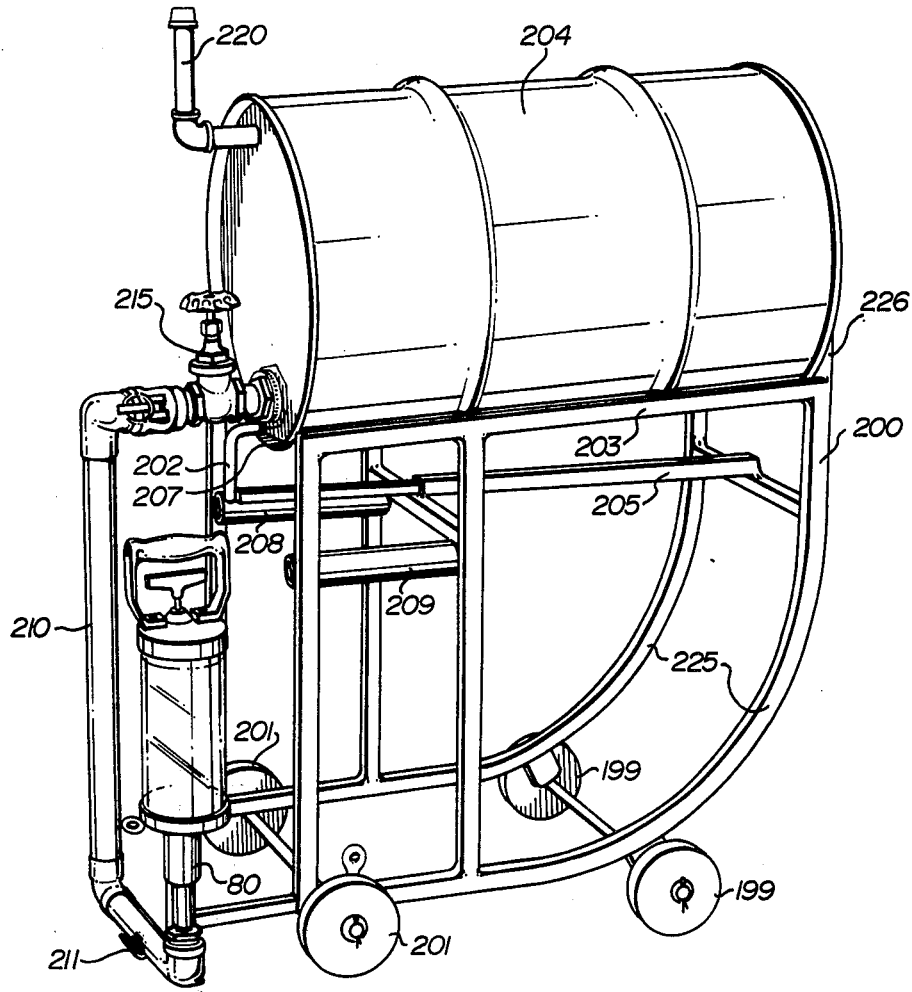
FIG. 5 is a perspective view of the bulk supply charger associated with the apparatus of FIGS. 1 to 4.

Reference to FIG. 5 shows a suitable bulk charging apparatus for use with the equipment of FIGS. 1 to 4. This consists of a cart 200 with four wheels 199 and 201, and a top supporting rib 203 which carries bulk liquid barrel or drum 204. A similar supporting rib (not shown) is present on the far side of the cart. At the front of the cart is a pipe 210 running downwards and across the front face of the cart where it terminates in an upward spigot in the coupling 80. The device of FIGS. 1 and 2 is seen resting in the coupling 80. The pipe 210 is supported by a foot 211 arranged on the cart. A valve is provided at 215 to shut off flow in the pipe 210, and the barrel 204 is also vented, as by neck 220. Rib 203 and its corresponding rib on the opposite side of the cart is inclined, so that liquid in the barrel will tend to drain towards valve 215.

The barrel rests in position on the ribs 203 against stop 226 at the rear of the cart. A hook catch 202 at the front of the cart can slide over the rim 207 of the barrel and retains it in position. The catch 202 forms the end of a rod which slides, fairly stiffly, in a sleeve 205.

The cart can be wheeled to any desired location by pushing it, or by lifting its front end and wheeling it on the two back wheels 199. Alternatively, a handle 221 comprising two arms and a cross piece may be coupled to the cart by sliding the arms of the handle into tubes 208 and 209 at the front of the cart. These arms can be a friction fit in the tubes.

Figure 6:
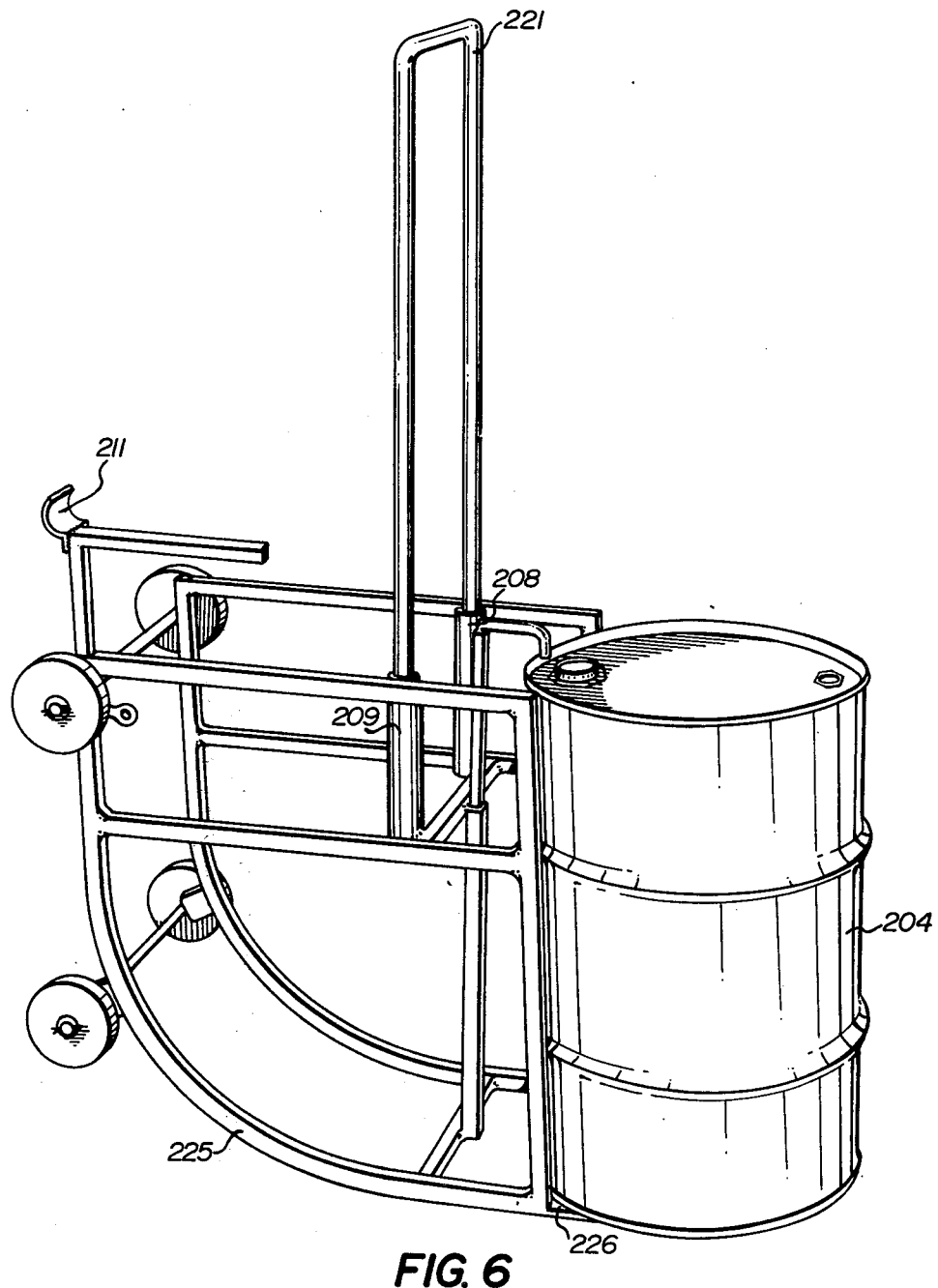
FIG. 6 is a view of the apparatus of FIG. 5 in position for loading.

It can be seen from FIG. 6 that when it is desired to unload an empty barrel from, and to load a full barrel onto, the cart 200, it is merely necessary, after ensuring that catch 202 is in place, that the cart be rocked back on its generally arcuate rear rails 225 by means of the handle if employed, but otherwise by merely lifting the front of the cart, so that the empty barrel is in an upright position. This barrel then rests on the stops 226 from which it can be rolled or lifted after the pipe 210, valve 215 and neck 220 and catch 202 have been uncoupled. A new barrel is then rolled into the position required on supports 226. The pipe 210 and valve 215 and neck 220 and catch 202 are connected up to the new barrel and then the cart 200 merely rocked into an upright position ready to bulk dispense a further barrel of liquid for filling into the device of FIG. 1. The front wheels 201 may be replaced by simple feet if desired, travelling movement of the cart being effected only on the rear wheels 199.

One of the many advantages which flow from the apparatus of FIG. 1, is that it may be provided with an additional nozzle which can be of the atomizing type and may also be given an air pump of simple design which can be actuated after the device has been filled. This is a particular advantage in cases where aerosol dispensing is required, since it does not require the presence of a fluorocarbon or polluting substance of any kind as a propellant. One can envisage arrangements whereby insecticides can be sold in bulk to purchasers owning devices of this form of FIG. 1, who can then charge and dispense the insecticide by means of air as a propellant. Bulk supply of many types of liquid are possible using this mechanism, particularly many of the liquids now supplied only in aerosol can form whose by-products, for instance, fluorocarbon propellants are a serious form of atmospheric environmental pollution.

The embodiments of the invention in which an exclusive property or privilege is claimed are defined as follows:

1. A liquid measuring and dispensing device which comprises:
    a liquid compartment,
    a bottom, side and top wall to the liquid compartment,
    handle carrying means to said compartment,
    a dispensing nozzle below said bottom wall and operatively connected for liquid flow from said compartment through said nozzle,
    venting means through the top wall,
    a float-insert operatively arranged to close said vent when liquid in said compartment reaches a chosen level,
    nozzle operating means adjacent said carrying handle,
    shut-off means in said dispensing nozzle movable between an open and closed position, means connecting the nozzle operating means to the shut-off means for controlling liquid flow through said nozzle, and
    closure means for said vent in said top actuated by said nozzle operating means and adapted to close said vent when said nozzle control is in closed position.

2. Apparatus as in claim 1, said nozzle comprising a hollow sleeve, and the shut-off means comprising an annular lip terminating said sleeve, and a lip engaging member for resiliently sealing against said lip for preventing liquid flow through said nozzle.

3. Apparatus as defined in claim 2, including a coupling nozzle for operative engagement with said nozzle,
    a stem in said coupling nozzle, a hollow interior to said stem, means for supplying liquid to said interior, orifice means in said stem communicating the outside of said stem to said interior,
    sliding sleeve means on said stem movable between a first position obturating said orifice means and a second position where said orifice means is unobturated,
    the stem being operatively engageable to said lip engaging member for raising said member off said lip,
    and said hollow sleeve in said nozzle being operatively engageable to said sliding sleeve for effecting disobturation of said orifice means for allowing flow of liquid from within said stem through said orifice means into said nozzle and subsequently into said compartment.

4. Apparatus as defined in claim 2, said lip engaging member being axially movable of said sleeve and said nozzle operating means connected to said lip engaging member for axial movement of said lip seal.

5. Apparatus as defined in claim 2, said nozzle operating means being arranged adjacent said carrying handle for actuation by a hand on said carrying handle.

6. Apparatus as defined in claim 2, connecting means between said nozzle operating means and said nozzle, axially movable through said compartment, and carrying said vent closure means.

7. Apparatus as defined in claim 2, including spring means for returning said nozzle operating means to closed position of said nozzle.

8. Apparatus as defined in claim 2, comprising an atomising nozzle connected to said compartment for atomising and discharging liquid under pressure in said compartment independently of said dispensing nozzle.

9. Apparatus as defined in claim 2, comprising an atomising nozzle connected to said compartment for atomising and discharging liquid under pressure in said compartment independently of said dispensing nozzle, and an air pump for introducing air under pressure to said compartment.

* * * * *